United States Patent
Narayanaswamy et al.

(10) Patent No.: US 8,300,634 B2
(45) Date of Patent: Oct. 30, 2012

(54) MOBILE DEVICE COMMUNICATIONS ROUTING

(75) Inventors: Ramprakash Narayanaswamy, San Jose, CA (US); Bryan R. Martin, Campbell, CA (US); Raanan Cohen, Tel Aviv (IL); Gaddi Menahem, Tel Aviv (IL)

(73) Assignees: 8x8, Inc., San Jose, CA (US); MobileMax, Inc., Herzelia (IL)

( * ) Notice: Subject to any disclaimer, the term of this patent is extended or adjusted under 35 U.S.C. 154(b) by 342 days.

(21) Appl. No.: 12/622,826

(22) Filed: Nov. 20, 2009

(65) Prior Publication Data

US 2010/0130169 A1    May 27, 2010

Related U.S. Application Data

(60) Provisional application No. 61/117,493, filed on Nov. 24, 2008.

(51) Int. Cl.
*H04L 12/66* (2006.01)
(52) U.S. Cl. ........ 370/352; 370/238; 370/351; 455/445; 379/221.01; 379/221.14; 379/272; 379/273
(58) Field of Classification Search .......... 455/410, 455/411, 414.1, 415–420, 428, 432.1, 433, 455/435.1, 445, 466; 379/142.07, 220.01, 379/221.01, 221.14, 265.11, 272, 273; 370/238, 370/259, 260, 351–356; 709/204
See application file for complete search history.

(56) References Cited

U.S. PATENT DOCUMENTS

| | | | |
|---|---|---|---|
| 6,782,080 B2* | 8/2004 | Leivo et al. ................. | 379/93.04 |
| 7,647,041 B2* | 1/2010 | Gonsalves et al. ............ | 455/420 |
| 2008/0118041 A1* | 5/2008 | Finogenov ................. | 379/93.02 |
| 2009/0221265 A1* | 9/2009 | Liu et al. ........................ | 455/411 |
| 2010/0197288 A1* | 8/2010 | Camilleri et al. ............. | 455/416 |

FOREIGN PATENT DOCUMENTS

WO   WO 2008089522 A1 *   7/2008

OTHER PUBLICATIONS

Gerry Blackwell, "*Jajah: Free VoIP with a Twist,*" www.voipplanet.com (Oct. 5, 2006).
Jeff Goldman, "*TalkPlus: a PBX for Mobile Phones,*" www.voipplanet.com (Aug. 16, 2007).

* cited by examiner

*Primary Examiner* — Anthony Addy
(74) *Attorney, Agent, or Firm* — Crawford Maunu PLLC (57) ABSTRACT

A variety of methods, systems, devices and arrangements are implemented for communications using a mobile communications device. In connection with various embodiments, one such method relates to routing calls specifying an endpoint device, from a mobile communications device to the endpoint device, using a call forwarding/routing service provider that establishes a connection with the endpoint device. The established connection may include, for example, a Voice-over-Internet Protocol (VoIP) connection. In some implementations, the authentication server is contacted (e.g., via the Internet) to authenticate the call to be made via the call forwarding/routing service provider.

23 Claims, 5 Drawing Sheets

MOBILE DEVICE COMMUNICATIONS ROUTING

RELATED PATENT DOCUMENTS

This patent document claims the benefit, under 35 U.S.C. §119(e), of U.S. Provisional Patent Application Ser. No. 61/117,493 filed on Nov. 24, 2008, and entitled "Systems, Methods, Devices and Arrangements for Routing of Communications of a Mobile Device;" this patent document is fully incorporated herein by reference.

FIELD OF THE INVENTION

The present invention relates generally to call and data routing for communications originating from a mobile device, and methods and devices for facilitating routing options for such devices.

BACKGROUND

Mobile devices and phones, such as cellular phones, first connect to a local cellular tower. The cellular tower can then establish a connection to other devices, mobile or otherwise, using the standard telephone network. This model has, for the most part, remained relatively constant for many years; however, the mobile phone industry has been introducing an increasing number of mobile devices with the ability to access the Internet in an affordable manner. Such mobile devices allow users to download content to their mobile device. Downloadable content can include, among other things, video, text and audio information. The location of the content provider is relatively unrelated to the ability of the user to access the content. That is to say, the content can originate from locations around the world with relatively little difference seen by the end user. This is different, however, from traditional telephone calls.

Mobile phone service providers base many of their service charges on the number, length and destination of calls made by cellular phone users. Charges can include per-call rates, per-minute rates and charges based upon the call origination/destination. Many service providers offer package options with unlimited calling to certain areas, certain individuals or the like. These packages are often associated with increased periodic (e.g., monthly) fees. International calls are often subject to some of the highest rates, both for per call/minute rates and for monthly package-related fees. Other fees include text messaging (e.g., short-message service or "SMS") and Internet access fees.

SUMMARY

Aspects of the present invention are directed to mobile communications applications that address challenges including those discussed above, and that are applicable to a variety of cellular applications, devices, systems and methods. These and other aspects of the present invention are exemplified in a number of implementations and applications, some of which are shown in the figures and characterized in the claims section that follows.

In connection with an example embodiment, a mobile audio cellular communications device includes a processing circuit configured to respond to a telephone number connection request, for an endpoint telephone number that corresponds to a remote communications endpoint, by carrying out call connections as follows. In a first mode, a connection request is sent to prompt a PSTN to route the connection request according to the endpoint telephone number. In a second mode, an authentication server is contacted using an Internet connection, and a routing telephone number for a call-routing provider is received from the authentication server. A connection request is sent to prompt a PSTN to route the connection request according to the received routing telephone number. Audio communications are established with the remote communications endpoint over a connection with the call-routing provider. This approach is amenable, for example, to implementation on a mobile telephone that operates under a calling plan assigned to the phone in the first mode, and operates under an alternate calling plan subscribed to by a user of the phone, which can be effected independently from any calling plan assigned to the mobile telephone (e.g., a plan by an issuer of the mobile telephone and its assigned telephone number).

According to another example embodiment of the present invention, an application is stored in a storage medium of a mobile communications device. When the application is executed by a processor, calls to a destination device are routed to a call forwarding/routing service provider. The call-routing service provider establishes a connection between the mobile communications device and the destination device. The established connection can use Voice-over-Internet Protocol (VoIP). In specific implementations, the application connects to an authentication server before the connection is established. This connection to the authentication server can be implemented using the Internet.

Consistent with one application of the present invention, a mobile audio communications device includes a processing arrangement. The processing arrangement detects an attempt to connect to a remote communications endpoint corresponding to a dialed telephone number. The mobile communications device contacts an authentication server using an Internet connection. A call-routing provider receives a telephone number from the authentication server. The mobile communications device connects to the call-routing provider using the received call-routing provider telephone number. Audio communications are established with the remote communications endpoint via a connection to the call-routing provider.

Consistent with an implementation of the present invention, a method includes establishing communications between a mobile cellular communications device and a remote communications endpoint. One or more applications are used to detect, at the mobile cellular communications device, dialing of a number for a remote communications endpoint. The applications are also used to connect the mobile cellular communications device to an authentication server using an Internet connection and to receive, at the mobile cellular communications device, a call-routing provider telephone number from the authentication server. The mobile cellular communications device is connected to the call-routing provider using the received call-routing provider telephone number. Audio communications are established between the mobile cellular communications device and the remote communications endpoint via a connection to the call-routing provider.

According to an embodiment of the present invention, a system is implemented for establishing communications between a mobile cellular communications device and a remote communications endpoint. The system includes an authentication server, a packet-based call-routing provider and a mobile cellular communications device. The mobile cellular communications device is arranged to detect a connect request for a remote communications endpoint corresponding to a dialed telephone number; contact an authentication server using an Internet connection; receive, from the authentication server, a telephone number for packet-based/call-routing service-provider; connect to the service-provider using the received service-provider telephone number; and establish audio communications with the remote communications endpoint via a connection to the service provider.

The above summary is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is directed to systems and devices for mobile device communications over a network, such as the Internet, and related approaches, their uses and systems for the same. While the present invention is not necessarily limited to such applications, various aspects of the invention may be appreciated through a discussion of various examples using this context.

Aspects of the present invention build upon elements of emerging technologies to provide a desirable service to users of mobile communications devices, such as a cellular phone. For instance, one embodiment relates to a system that facilitates communications from a cellular device by intelligently routing calls to a packet-based communications provider. Leveraging off of the increasing processing power and functional adaptability, the routing of calls can be controlled, in part, by the mobile device when a call is initiated. Internet access can be used to configure the mobile device, such as during an initial setup or using real-time information. A remote server provides a packet-based connection (e.g., Voice-over-IP) from the mobile device to a desired recipient of the communication. Various example embodiments of the present invention are directed to these and other aspects individually, as a device and/or as part of a system. Other embodiments involve methods that may use one or more of such aspects.

The present invention is believed to be applicable for a number of cellular communication devices, such as mobile devices that communicate with a remote server providing packet-based communication. While not necessarily limited to current cellular technology, various embodiments have been discussed in terms of such cellular technology. There are a variety of other communications devices that could also benefit from various aspects of the present invention.

In connection with an example embodiment of the present invention, mobile communications are effected via user-subscription to call-routing services. For instance, a user that subscribes to a service for facilitating call routing may install, configure or otherwise enable a software-based application on a cellular device. By executing the software-based application, the cellular device is application-configured to perform a number of functions including functions that effect registration of the cellular device with a service provider and/or specific remote servers. When the cellular device receives user-input for placing a telephone call, the application-configured device receives or otherwise accesses the number for the placed telephone call and makes an initial determination on how to handle the call. Discussions of exemplary algorithms for such a determination are provided in more detail infra.

In some instances, the application-configured device completes the telephone call using a standard cellular call routing. In one such example, the mobile device communicates with a cellular tower (e.g., a cellular site, or a base transceiver station) by providing the telephone number of a destination device (e.g., a number corresponding to the received user input). The cellular tower connects to the destination device by providing the telephone number to a Public Switched Telephone Network (PSTN). The PSTN controls the routing using the provided telephone number and thereby establishes a connection between the application-configured device and the destination device corresponding to the telephone number.

In other instances, the application-configured device completes the telephone call by connecting first to a call handling/routing platform (e.g., as implemented by one or more telephone network circuits). For example, the calling mobile device communicates with a cellular tower by providing the telephone number of the platform. The cellular tower connects to the destination device by providing the telephone number to a Public Switch Telephone Network (PSTN). The PSTN controls the routing using the provided telephone number and thereby establishes a connection between the calling device and the platform. The platform forwards the call to the destination device, thereby establishing a connection between the calling device and the destination device.

One or more of a variety of different mechanisms are used to determine the telephone number for connecting to the platform, in accordance with a number of different telephone area codes (e.g., for different geographical areas). One such mechanism uses a geographically-independent access mechanism, such as an Internet connection, to determine a telephone number for connecting to the platform. Another mechanism uses information such as security data in addition to a received telephone number in order to establish a connection. This can be useful for, among other things, security and reducing the time necessary to connect the call. Once the telephone number is determined, the platform is called and, in response, provides call routing functions for routing calls from the calling (cellular) device to a device associated with the called number using, for example, Voice-over-Internet-Protocol (VoIP).

Accordingly, the various embodiments as discussed herein may be implemented using a variety of structures and related operations/functions. For instance, one or more embodiments as described herein may be computer-implemented or computer-assisted, as by being coded as software within a coding system as memory-based codes or instructions executed by a computer processor, microprocessor, PC or mainframe computer. Such computer-based implementations are implemented using one or more programmable circuits that include at least one computer-processor and internal/external memory and/or registers for data retention and access. One or more embodiments may also be implemented in various other forms of hardware such as a state machine, programmed into a circuit such as a field-programmable gate array, implemented using electronic circuits such as digital or analog circuits. In addition, various embodiments may be implemented using a tangible storage medium that stores instructions that, when executed by a processor, performs one or more of the steps, methods or processes described herein (e.g., the processor is configured via the instructions). These applications and embodiments may also be used in combination; for instance, certain functions can be implemented using discrete logic (e.g., a digital circuit) that generates an output that is provided as an input to a processor.

As discussed herein, reference to terms such as a telephone number for a recipient or for an intermediary may refer to one or more types of identification that can be used to identify such a recipient or intermediary. In many embodiments, this identification is the telephone number or a related device associated with the telephone number. In other embodiments, this identification is one or more of a variety of different types of data that are either related to a particular telephone number or direction to a particular device (in a similar context).

Figure 1:
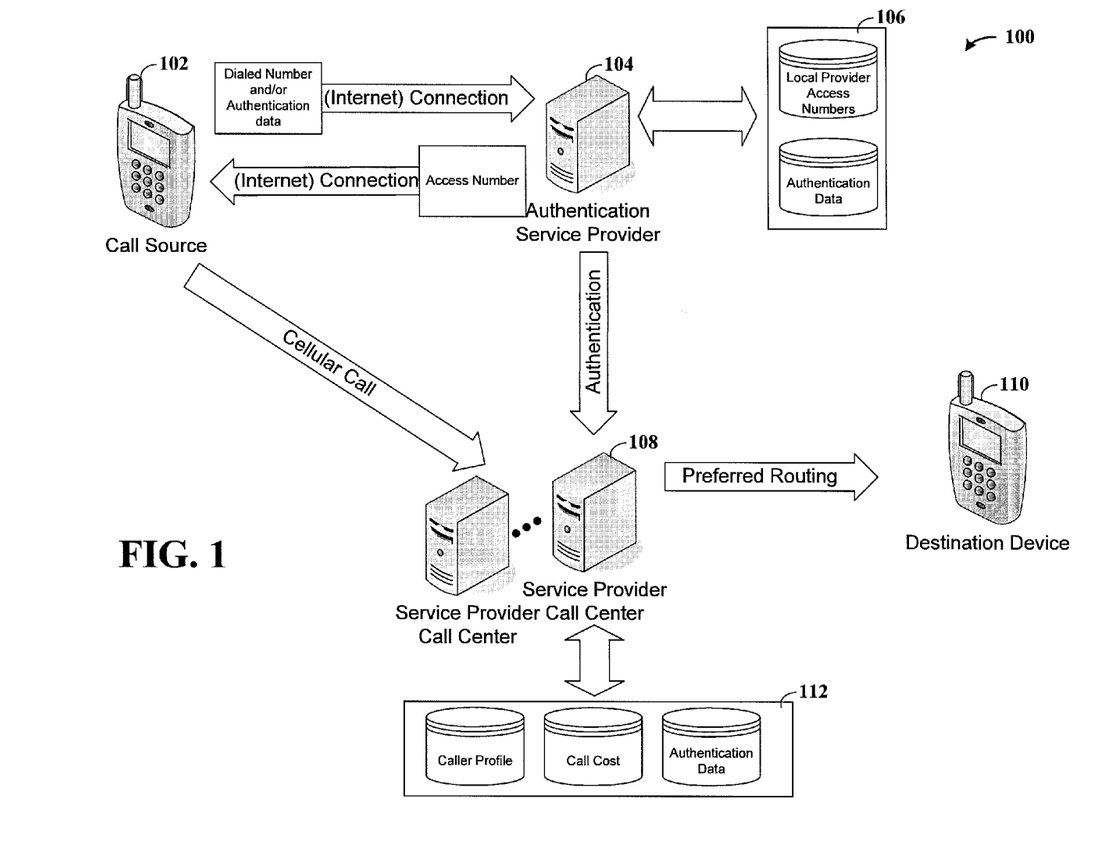
FIG. 1 shows a system and the data flow between system elements in a manner consistent with embodiments of the present invention.

Turning now to the figures, FIG. 1 shows a system 100 and controlled data flow between system elements, consistent with various example embodiments of the present invention. Call source 102 is a communications device that can be implemented as one or more of a number of different cellular or other mobile communications devices. Destination device 110 can be implemented as a variety of different communications devices such as mobile, landline or other devices. The call source 102 has an input that is configured to receive user input indicating a desire to initiate (audio) communications with destination device 110. Generally speaking, this involves receiving dialing inputs or other inputs that can be used for selecting the telephone number of destination device 110, such as by using a voice command, speed dial or address book link. The call source 102 sends this telephone number information to an authentication service provider (e.g., a server) 104. Additionally, authentication information can be sent to authentication service provider 104. Such authentication information can be used to verify call source 102 and/or the user of the call source 102 against authentication information stored in database 106. Upon verification, authentication service provider 104 sends an access telephone number back to call source 102. Authentication service provider 104 can also send information to service provider call center 108.

The call source 102 uses the telephone number to contact service-provider call center 108. Service-provider call center 108 uses database information 112 (e.g., caller profile, call cost data or authentication data) to determine whether/how to connect call source 102 to destination device 110 (e.g., using VoIP).

In some embodiments, the system 100 uses an Internet connection to facilitate communications between the call source 102 and authentication service provider 104 to access to call center 108, by communicating data over the Internet connection. The system 100 is also configured to use the Internet connection to facilitate the dynamic selection/control of a particular call center 108. In one instance, an independent server (e.g., implemented in connection with call center 108) is used to execute complicated decision processing for routing calls and/or data, which relieves the call source 102 from the burden of such processing. The server can thus be used, for example, to relieve such burdens from call sources such as a mobile device that may be limited in processing power or capabilities, or may be desirably operated under lower power consumption conditions. In some implementations, the independent server is configured to execute functionality that may not be possible with the call source 102, such as by making routing or related communications decisions based upon call center capabilities (e.g., call loads on the call center(s) 108), service plan status, Internet congestion issues, stored user profiles, specific carrier plans (and plan changes) and/or use restrictions. For certain embodiments, the Internet connection is used to facilitate one or more security/authentication mechanisms available for Internet and communications the data transmission protocols associated therewith. A few exemplary mechanisms are discussed infra.

Figure 2:
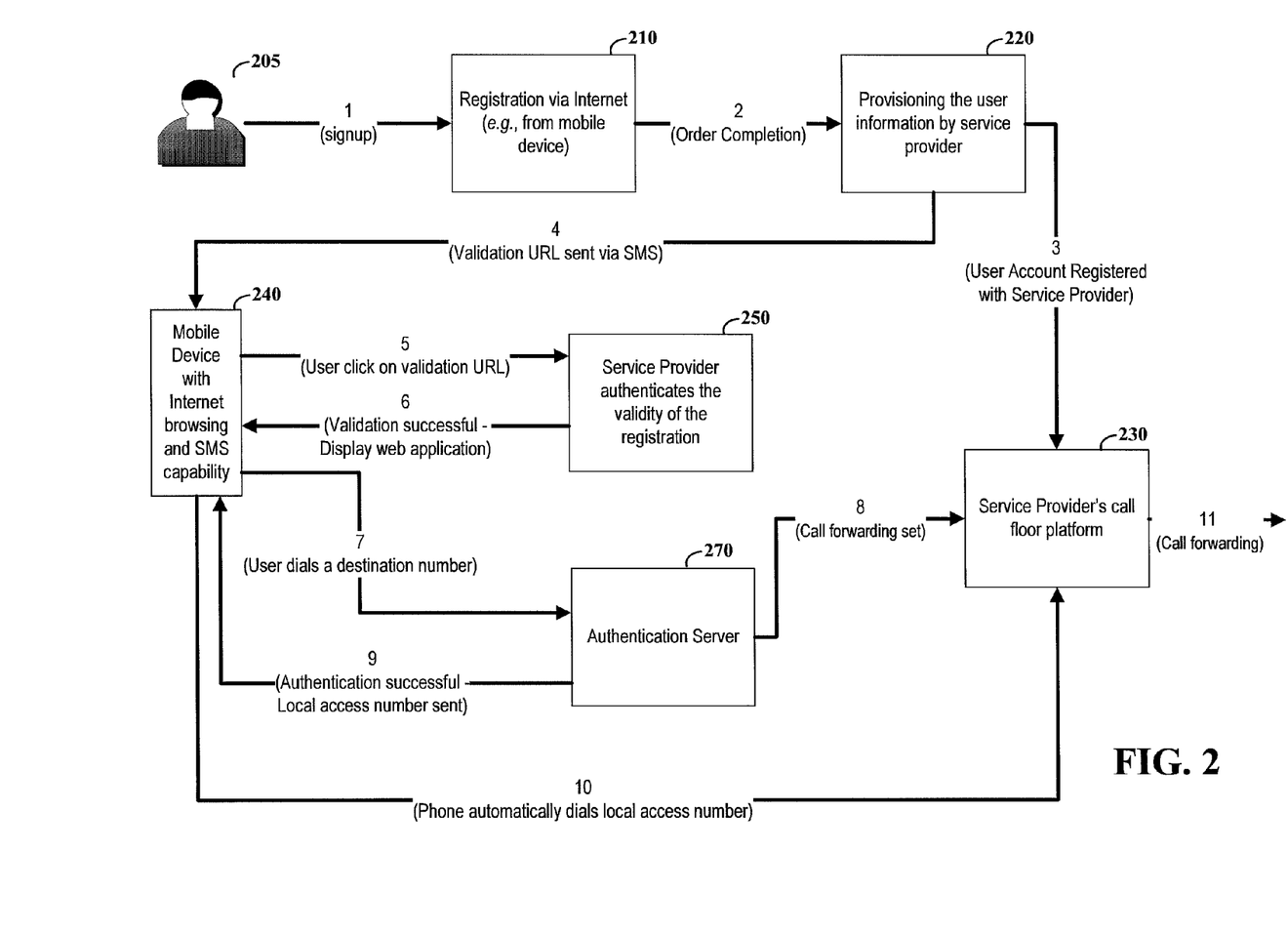
FIG. 2 shows a flow/process diagram for use with embodiments of the present invention.

FIG. 2 shows a flow/process diagram for mobile device communications, in accordance with one or more example embodiments of the present invention. Step one of the process, and referring to block 210, involves registering/signing up a user 205 for a mobile communications service. In one embodiment, the registration is accomplished using a mobile device and a wireless-type connection, such as an Internet connection. A user can navigate to the service using a browsing application or a local application running on the mobile device, such as a software-based application or other type of circuit/programming that facilitates communications functionality for the service. The local application can be installed as a default application (e.g., as part of an agreement with the mobile device provider/seller), downloaded by the user directly to the mobile device or uploaded to the mobile device from a storage device. This flexibility facilitates the registration of a variety of mobile devices and/or mobile communications service providers independently of whether or not preexisting agreements are in place to include the application on the mobile device when the device is initially sold to a customer.

In some embodiments, the mobile device uses an Internet connection to access and download the application for subsequent execution. The application can be implemented for functioning with a wide variety of mobile devices and operating systems, or can be tailored to the type of mobile device and/or operating system running on the mobile device as appropriate.

As part of the registration process, identification, billing, service plan selection and other information can be provided. The user can enter such information using a number/text pad of the mobile device, or can be provided via other mechanisms. For instance, where much of the necessary information has already been provided as part of an agreement between the user and the service provider for the mobile device (e.g., the cellular service provider), the identification of the calling number and/or the specific mobile device could be correlated with this information. Similarly, where the user has already provided much (or all) of the necessary information to a routing-based service provider, such information can be re-used. Accordingly, the provision of such information may be commensurate with data maintained by an existing service with the routing-based service provider (e.g., a VoIP telephone service) or via information gathered during a pre-registering step carried out prior to connecting through the mobile device (e.g., using a home computer connected to the Internet or by calling a registration number to speak with a customer service representative). Such information can be presented to the user of the mobile device for confirmation.

This allows the user an opportunity to verify the information is correct. Of course, appropriate security measures can be taken to avoid fraudulent activities. This can include, for example, a verification step that is independent of the mobile device (e.g., electronic confirmation via email, personal identification information, or secret billing information, such as pin/security numbers associated with credit card purchases).

Once the registration information has been provided, the order can be considered complete and step two of the process is implemented, commensurate with block 220. During this step, the registration information is processed. The registration information can then be sent to (and stored by) the call-routing service provider as shown by step three and block 230.

In a particular implementation, a unique validation URL is sent to a mobile device. As shown in step four (block 240), this URL can be sent using the short-message service (SMS) protocol to the mobile device. The URL can be accompanied by additional data such as an explanation of what the message contains, how to enable the service and/or instructions for the holder of the mobile device if the holder did not request the service (i.e., indicating a fraudulent registration attempt). The use of the SMS protocol can provide additional security to the process because the SMS protocol is separate from the Internet connection, thereby allowing validation that the mobile device is physically held by the user registering for the service.

At step five (block 250), the user selects the URL to validate the registration. Upon a successful validation/registration, the mobile device is enabled to provide call routing control by implementing steps seven through eleven and involving blocks 230, 240 and 270. This can be facilitated by displaying a web application, as shown by step six. If, however, the validation/registration is not successful, an error message can be sent to the user. The user may then be prompted to attempt the registration again or to contact a customer service agent.

Once the service has been enabled, the application as executed on the mobile device detects a user input indicative of a telephone number of an endpoint device, such as by detecting a dialed telephone number. The application-programmed mobile device can determine whether to allow the dialed telephone number to be processed as a normal call or to process the call using the call-routing service provider. In a specific implementation, the determination is based on whether or not the call is an international call. If the call-routing service provider is to be used, the dialed destination number is provided to an authentication server as shown by step seven.

Upon a successful authentication, the dialed number information and additional authentication/security data is sent to the service provider's call floor platform in step eight. Also upon a successful authentication, a (local) access number is provided back to the mobile device in step nine. At step ten, the mobile device dials the access number to connect to the service provider's call floor platform. The call is then forwarded using the desired routing (e.g., VoIP) in step eleven.

A specific example embodiment of the present invention includes the following implementation of the process of FIG. 2. Under some web applications, a user 205 (operating a mobile device) is authenticated using a login and password before access is allowed to private information. Such logins can be made, for example, using https (Hypertext Transfer Protocol Secure) to ensure basic security over the Internet, or another type of automatically-initiated authentication. In one such example, authentication is carried out over "https" with the login information being maintained in cookies as encrypted data. This encrypted data (e.g., a Message-Digest algorithm 5 (MD5) key) is sent to the server when an https request is sent to the server and the cookie is maintained in the mobile device's browser.

In addition to the authentication cookies, other cookies can be used to help determine whether the request is coming from the same mobile device. An example of such cookies is a "Random Sequence Key" (RSK), which is a unique number generated per transaction request from the mobile device. Such RSKs are also sent via https which increases their security. If a different device invokes a similar request, the presence/absence of RSK helps ensure the security as a check that is in addition to the authentication cookie.

The use of such cookies facilitates a seamless experience for the user who dials a destination number by simplifying or removing unnecessary authentication steps. For instance, there is no need to remember and dial any prefix/suffix along with the destination number to authenticate with the service provider before the call is connected to the destination device.

In one particular embodiment, an international telephone call is made as follows. When a user dials an international number, the number is automatically converted into a local call to avoid additional (international) toll charges to the user. In a specific example, the international calls are routed to a service providers' VoIP network to allow the user to incur a reduced charge.

Such an example embodiment can include the following steps.
1) The user signs up and registers with the service provider.
2) The service provider creates a unique access number for this user, and a unique pin number and generates a MD5 key using the combination of:
  a. User's mobile number
  b. User's pin #
  c. User's access #
3) The MD5 Key is saved by the Service Provider as the unique key for the user.
4) The MD5 Key is also stored as a cookie in the Mobile Device's web browser.
5) The user dials a destination number in the web browser (mobile device).
6) The cookie (MD5 Key) is received by the service provider and the validation is performed. If the cookie is found in the service provider's database, then the request is considered to be valid. Otherwise, an error page will be displayed asking the customer to go through the signup and registration process.
7) The destination number is also received by the service provider (as part of step 6). The service provider sets up a "call forwarding rule" to this "destination" number in the user's account. This "call forwarding rule" is only valid for the next 30 seconds and will only be triggered when a call is initiated from the user's mobile device. This is done using the caller-id of the call.
8) The service provider returns the access number corresponding to the user account in the web response.
9) The browser (of the mobile device) receives the access number in the form of "tel:number" which triggers a telephone call from the mobile device to the access number.
10) The service provider receives the call (which corresponds to the user's account).
11) The service provider validates the "mobile number" (using the caller id information).
12) The service provider forwards the number using a selected call routing scheme.

This example implementation can be conceptually divided into various components. One such component is the registration component. The registration component allows a user to register for the service. This component can be implemented as a web-based application designed to collect user information, such as first name, last name, mobile phone number, international mobile equipment identity (IMEI), electronic serial number (ESN), physical address of the user (for billing purposes) and/or credit card information (for automatic billing purposes). One or more validations are performed during the registration process including the validity of the credit card etc.

Another example embodiment is directed to activation of a mobile device, which ensures that the user who successfully registers can activate the service for their mobile device. Upon successful registration by a user, an SMS message is sent to the user's mobile device specified via the registration. The SMS message contains a unique URL (for the specific user) which the user accesses to register/activate the service. Since the SMS is received by the registered mobile device, the URL which is part of the SMS that has the encoded MD5 key ensures that the request originated from the mobile device. At this time, this MD5 key is also registered as a cookie in the mobile devices' browser.

A phone dialer component is responsible for authentication during initiation of a call from the mobile device. Upon successful registration, a phone dialer shows up in the mobile device, for accepting an input telephone number for initiating a telephone call. In a specific implementation, the phone dialer is a web-based application run on a web browser application, which helps in performing the following task sequence:
1) Collection of the destination number from the user.
2) Sending of the authentication information to the service provider over https.
3) Upon successful authentication, setting a "call forwarding" request at the user's account for the "destination number" entered by the user.
4) Initiation of a local telephone call using one of the service provider's telephone numbers. This can be implemented using the "tel:" uniform resource identifier (URI) and the browser.
5) The service provider receives the telephone call and the call is automatically forwarded to the "destination number" as per the step (3) above.
6) The user's account is charged for the call.

A re-activation component is responsible for reactivation of an account and/or registration. Re-activation can be implemented when a mobile device is no longer activated. This can occur, for example, when a user enables a new mobile device or deletes the authentication cookie in a currently-registered mobile device. The re-activation component can be automatically triggered when a web request is received without the proper information. The re-activation component can request confirmation information to allow for the mobile device to be reconfigured and/or for re-activation of the user account at the service provider. The confirmation can be accomplished by requesting a login ID, password and the mobile device telephone number. This can be accomplished entirely at the mobile device or using a separate mechanism (e.g., a call to customer service). Upon successful verification, a cookie (MD5 key) will be generated and registered with the mobile device. The user is then free to invoke the phone dialer component to place calls using the system.

In connection with another embodiment, a fraud detection component operates to mitigate fraudulent use of a service as described herein. In one implementation, a fraud condition is detected when an RSK key received by the service provider does not match with the RSK generated by the service provider. In one implementation the RSK key lookup is two levels (i.e., the RSK can match with either of the previous two generated keys), a second time error triggers a reset activation component and a new SMS is sent to the mobile device identified via registration. Since there is only one mobile device with a given Mobile DID, the original user (or original device) will receive this SMS. By clicking the URL in the SMS, the device is successfully re-activated. This approach protects, and limits the use of a particular user's account to a specific device that is registered for a user (or, where appropriate, to two or more devices registered to a particular user). Further protection can be provided by using secure/encrypted connections, such as HTTPS (Hypertext Transfer Protocol Server), when sending sensitive data such as the authentication cookies.

In many implementations, call-flow is carried out as a two-step process. In the first step, authentication and initial call-forwarding setup are carried out. In the second step, a call to a local access number triggers call-forwarding. Obtaining fraudulent access/authorization in one of the steps does not guarantee access to the other step (e.g., access in one step is different/separate from access in another step).

In some implementations, an additional confirmation is implemented using ANI (Automatic Number Identification) signals from the telephone company to ensure that an initiated telephone call originated from a mobile device corresponding to the mobile DID of the user registered to the service used to make the call.

The system can also be configured to prevent multiple calls to be forwarded from a single authentication. For example, the system can set up a call-forwarding rule for the particular user's mobile device. Once a telephone call is initiated (forwarded to the destination), the call-forwarding rule is removed. This helps prevent repeated calls to the same destination using the same authentication.

Various embodiments of the present invention are directed to user account monitoring functions and circuits that carry out such functions. For instance, a pre-determined usage limit can be set to limit a number of minutes and/or dollar amount of any charges to the account. An excess usage in any one of the categories can trigger an alarm in a given user's account, and the account may be flagged for potential fraud. In some implementations, excess usage in a user's account triggers an automatic credit card charge; failure to successfully charge a credit card can flag an account as fraudulent or otherwise over limit. In other implementations, an account is flagged for potential fraud in response to a predefined number of call attempts being exceeded for a given duration. In response to detected fraud, one or more of a variety of appropriate actions may be taken, such as notifying a registered user and/or suspending activity related to the registered user's account.

Figure 3:
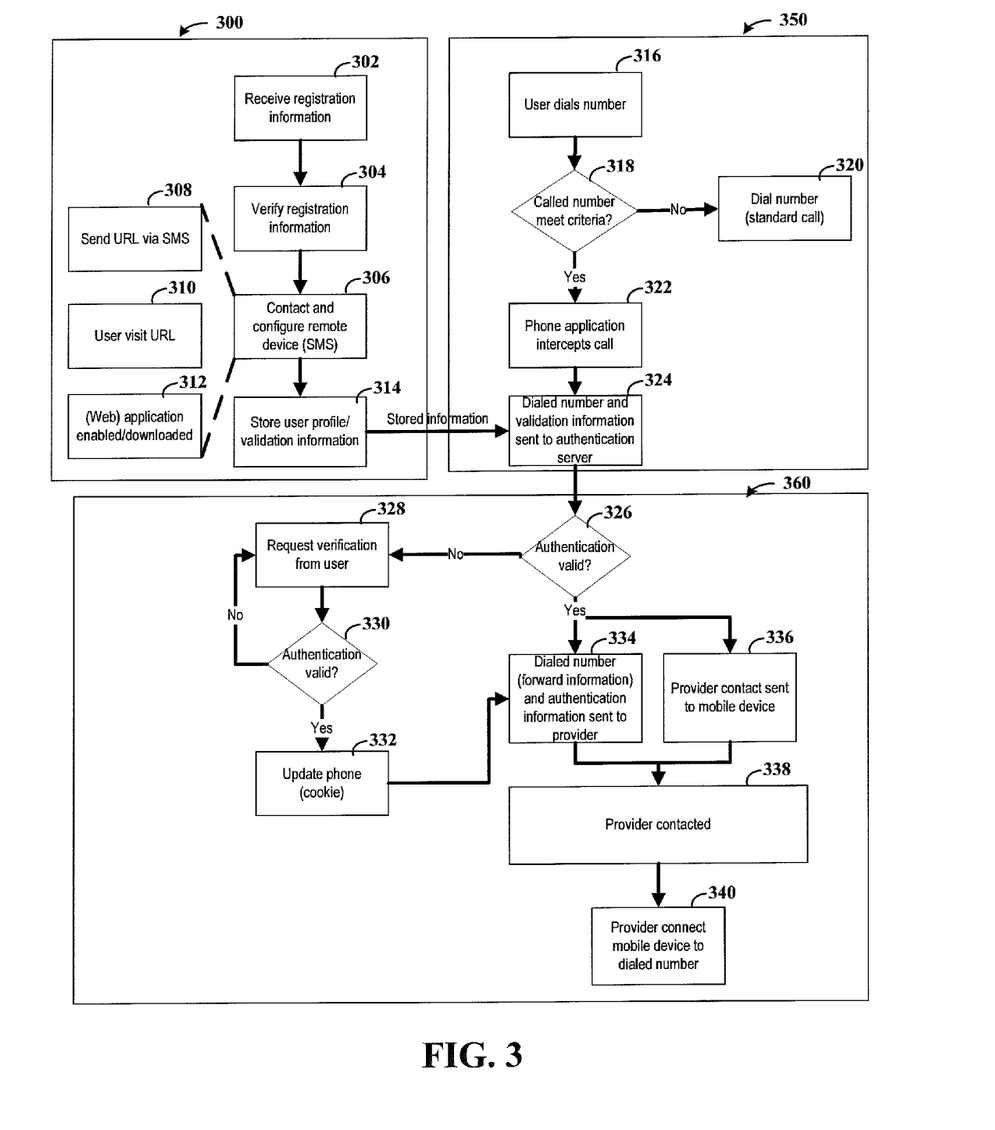
FIG. 3 shows details of an algorithm and process/data flow consistent with various aspects of the present invention.

FIG. 3 shows details of process/data flow consistent with various aspects of the present invention. In certain contexts, the process/data flow as shown in FIG. 3 is executed by a processing circuit as an algorithm, in accordance with one or more of the various embodiments discussed herein. The process shown in FIG. 3 is generally separated into three different sections (300, 350 and 360). Section 300 relates to registration aspects for a particular user. Section 350 relates to the initial handling of a call initiated by an application running on the mobile device. Section 360 relates to authentication and routing/forwarding of the call.

A user provides registration information at block 302. This registration information can be provided over the Internet, in a telephone call, on a written application or other suitable methods. For example, a user could browse a registration site using a mobile device or another Internet-capable device, or could call a customer service agent to provide the necessary information. At block 304 the information can be verified and is provided immediately (e.g., by verifying the billing information is correct and has sufficient funds) and/or performed at a later time (e.g., by verifying that the information, such as the telephone number and the name on the billing information, is consistent and correct). In one implementation, two or more levels of verification are implemented at respective times.

The mobile device is configured at block 306 to operate for making calls. In one implementation the configuration is implemented by sending a URL via SMS at block 308. When a user visits the URL at block 310, a (web) application is installed or enabled at block 312, which may be carried out after or before the registration information is provided. Where the application is installed prior to registration, the application can be used to assist in the registration process.

In response to a registration request, a unique URL is generated and sent to the mobile device. In one implementation, the unique URL is sent to the device using different communications mechanisms that are used in the registration process, such as using SMS messages. The user then visits the URL. This can be particularly useful to verify physical possession of the mobile device.

At block 314, information about the user, such as profile information, validation information or billing information, is stored for use by the call-routing service provider. This information can then be used for future authentication, call routing decisions and/or access to user profile configuration, e.g., blocks 324 or 326.

Once the application on the mobile device is activated, the process begins with block 316, when a user provides an input indicative of an endpoint (called) telephone number (e.g., by dialing the number). In some implementations, the telephone number is processed to determine whether criteria for using the service has been met, such as by determining whether the number pertains to an international call, or by determining whether user-defined criteria has been met. If the criteria are met, the telephone call is made using the application installed at block 312. If the criteria are not met, the telephone call can be made using a regular call plan to which the mobile device is subscribed (e.g., where a user purchases and uses such a regular calling plan, and uses the downloaded application-based calling approach under certain conditions). If a called number does not match the criteria at block 318, then the call is completed at block 320 as a standard (cellular) call.

Where a user sets criteria for using the application-based calling approach, such criteria may include area codes, specific telephone numbers, time of day, current call times (whether standard call time or VoIP call time) or the like. As an example, a caller may have a calling plan that allows for unlimited calls to certain telephone numbers or to callers who use the same service provider. The caller could set the criteria to limit use of the application-based calling approach (e.g., VoIP) which is executed via the application when calling numbers that are outside of a particular region relating to a call plan. The criteria may similarly be set for using the application-based calling approach when the user has exceeded a total number of minutes available on a call plan (e.g., where the user's mobile device has a regular call plan yet is further configured to make calls via the application), to permit the user to maintain a lower available-minute plan yet avoid high over-minute charges. In another example, the caller may have a plan that has cheaper rates during off-peak hours, or other rate considerations, and a least-cost calling option can be selected based upon these plans. For instance, if a user has unlimited night and weekend calling over a regular plan, the application-based calling approach may be avoided during those times, regardless of any limit on minutes available in a regular call plan for the user. The application can use specific data relating to the actual user's calling plan, or simply use an estimation of expected costs. In some instances, the length of a call may be determinative as to which calling option is most economical. For such instances, a popup-screen option is provided for a user, who can select an expected talk time via the popup-screen option. Past call times can also be used to predict an expected length of a current call. This flexibility can be particularly useful for a business, government or other entity applications in which a large number of phones are issued under a common plan. Optimized plans can be generated for each of the phones based upon expected use, or a general plan can be generated and used for every phone.

If the called number meets criteria at block 318, the call is intercepted at block 322, and the number called and validation/security information is sent to an authentication server at block 324. As discussed supra, the security information can be implemented using the Internet, an MD5 cookie and HTTPS protocols. In one embodiment, an authentication server indicates that the destination number should be dialed directly instead of using the call-routing service provider. This allows for some or all of the routing decisions to be carried out remotely from the mobile device. This can be particularly useful for allowing the user to setup the call-routing options over a web interface. For example, the user can log into a website that allows for configuration of the criteria associated with any phones associated with the particular user. Moreover, the authentication server can be updated with current pricing, thereby potentially minimizing the need to update each mobile device every time there is a change.

If the authentication server determines that the call is not valid at block 326, the user can be requested to enter additional authentication information such as a password at block 328. If the additional authentication information is determined to be invalid at block 330, the user can be prompted to again provide the information. This authentication can be repeated as necessary or limited to a set number of attempts (e.g., one or more). If the number of attempts is ultimately exceeded, the call can be flagged as potentially fraudulent. The call can then be completed as a standard call. Optionally, all future calls can also be completed as standard calls until such a time as the user's identity can be verified. Assuming that the additional authentication information is determined to be valid at block 330, the mobile device can be updated at block 332 (e.g., with a new MD5 cookie).

Once authentication has been validated (e.g., at blocks 330 or 326), the dialed number is sent to the call-routing server/provider at block 334. As an additional security measure, authentication information can also be sent. This security information can take the form of a time-limited encryption key, such as an RSK. At block 336, a telephone contact number for the call-routing server/provider is sent. In various embodiments, a plurality of different numbers may be sent for one or more users, for accessing call-routing server/provider(s), and such access numbers can be set according to the plan for the particular user to which they are sent. In some instances, the access number is associated with a current geographical location which is associated with the user's telephone number, and the user's calling plan charges differently for locations outside of a current (or some other identified) geographical location. In another instance, different telephone numbers are associated with a caller plan where, for example, the caller has designated one or more of the call numbers to be included in a discount plan. For example, some cellular-service plans permit a certain number of most-commonly dialed numbers to have unlimited minutes. Accordingly, users of such plans might benefit from use of the same access number where the access number is one of the user's most commonly-dialed numbers.

The mobile device then contacts the call-routing server/provider at step 338. This can be accomplished, for example, using a URI command with the appropriate access number as a parameter. The call-routing server/provider then connects, at block 340, the mobile device to the dialed number using a preferred routing selection. In an example implementation, the preferred routing selection can be implemented using a VoIP connection. Other implementations, however, may provide additional options including, but not necessarily limited to, a landline connection.

Figure 4:
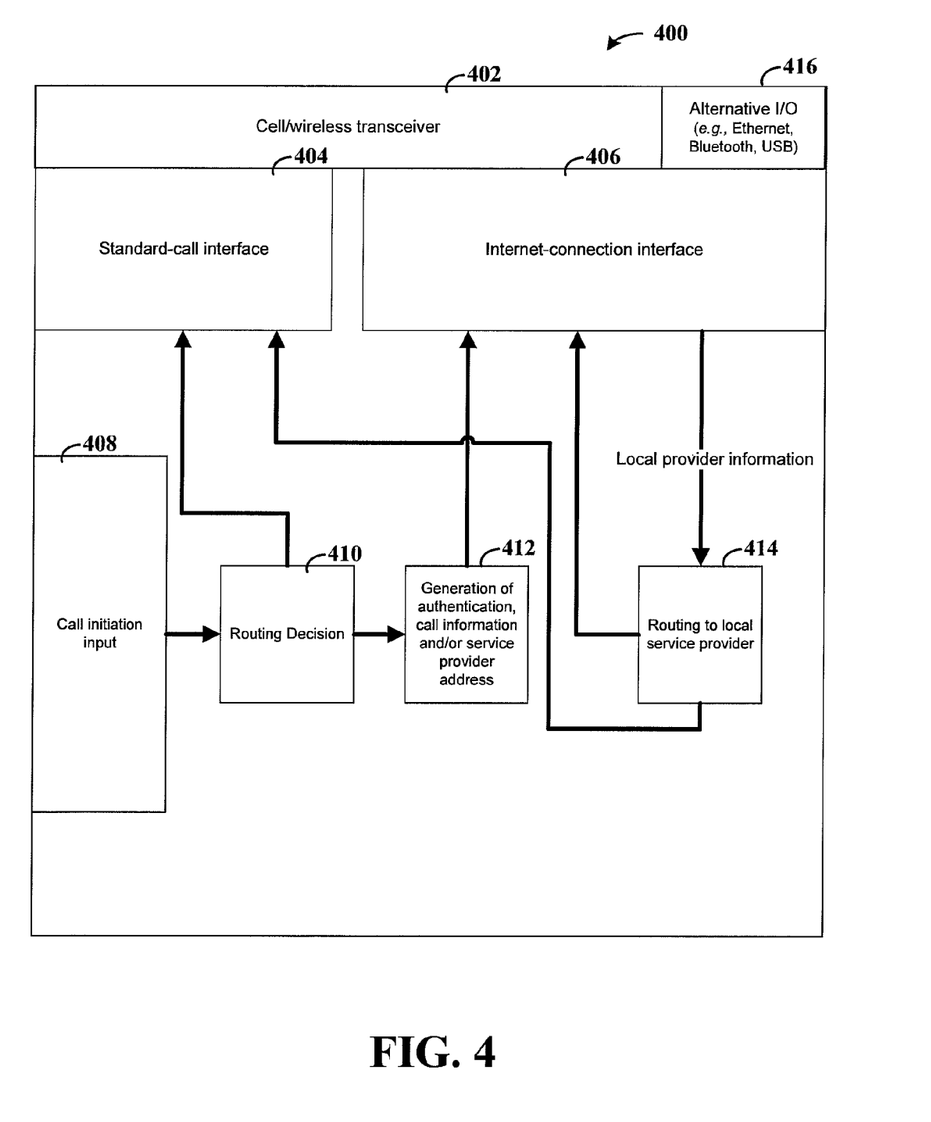
FIG. 4 depicts a block diagram for mobile device 400 that is consistent with an embodiment of the present invention.

FIG. 4 depicts a block diagram for mobile device 400, consistent with another example embodiment of the present invention. Wireless transceiver 402 communicates with a remote transceiver, such as a cellular tower. Mobile device 400 is configured to communicate in at least two modes, the first using standard-call interface 404 and the second using Internet-connection interface 406. A user of mobile device 400 can initiate a call by entering appropriate information through call initiation input 408. Call initiation input 408 can be implemented using a variety of different input mechanisms including, but not necessarily limited to, keypads, touch screens, buttons or voice-recognition. Upon a request to initiate a call, a routing decision is performed at block 410 to determine whether the call is to be handled as a standard call or using the call-routing service provider. If the decision results in the latter, authentication information, such as the Internet address of an authentication server and other call-related information, is generated at block 412.

The authentication server is then contacted using an Internet connection interface 406. In one instance, the Internet connection interface 406 is connected to the Internet using transceiver 402. In various implementations, the device 400 includes one or more circuits capable of making additional connections to the Internet, such as Ethernet, Bluetooth™, Universal Serial Bus, 802.11x wireless or infrared. As such connections can sometimes be used to provide Internet access that is not charged per-use, the mobile device can be configured to select and use such connections instead of the cellular connection. Moreover, the existence of a valid connection to the Internet on such alternative connections could be used in the routing decision block 410. For instance, such connections could allow for the mobile device to use an entirely VoIP connection. This variation would allow the mobile device to connect to a call-routing server directly over the Internet connection rather than first using a telephone-access number over a cellular connection.

When use of the cellular connection is desired, the mobile device awaits an access number for contacting a call-routing server, which is provided by the authentication server upon validating the mobile device. The mobile device then contacts the call-routing server by routing call information (at block 414) using the cellular transceiver 402. The call-routing server forwards the call to the dialed number using a preferred call-routing, such as VoIP.

Figure 5:
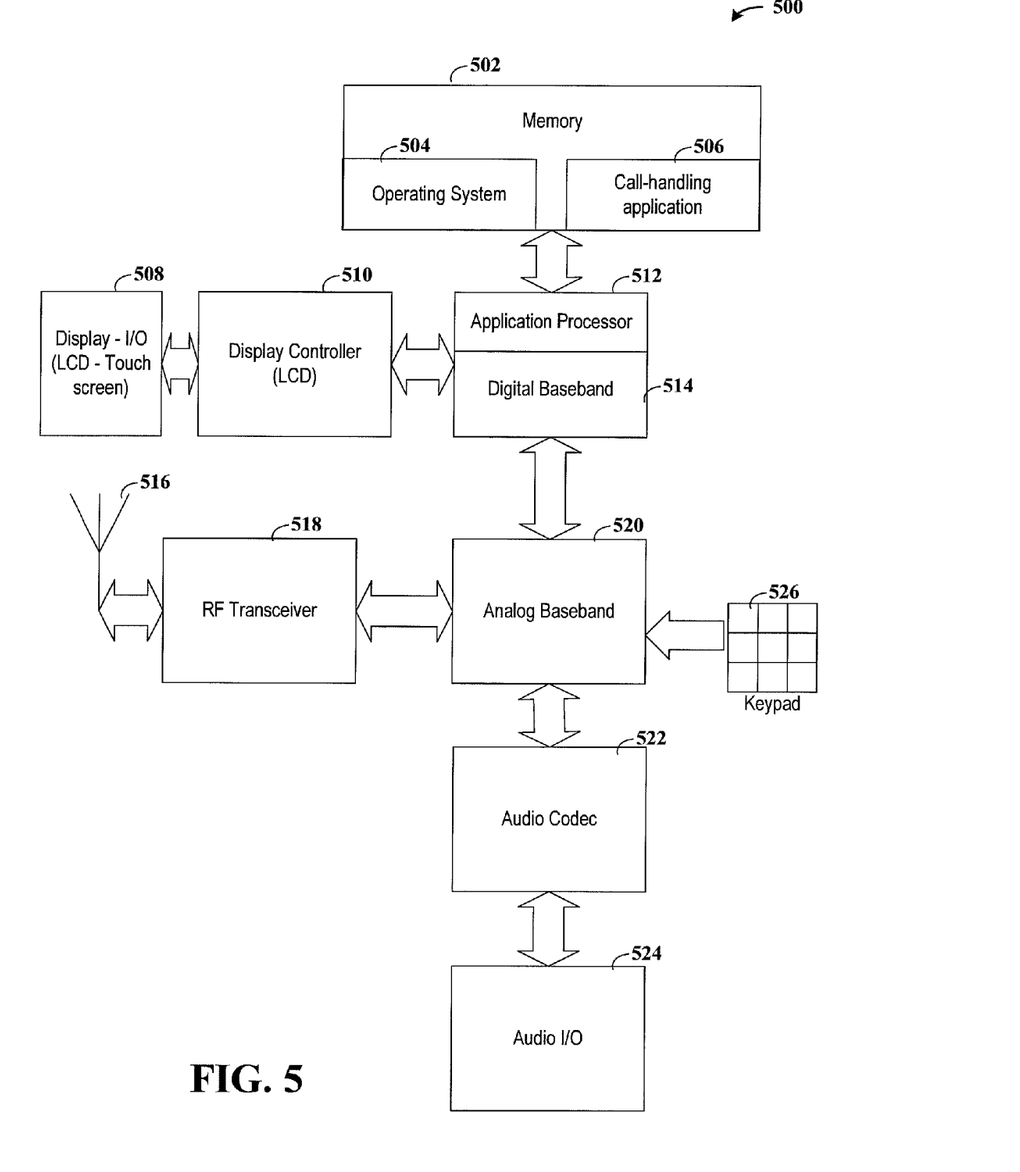
FIG. 5 shows a variety of components present in a mobile device that is consistent with an example embodiment of the present invention.

FIG. 5 shows a variety of components present in a mobile device 500, consistent with another example embodiment of the present invention. The components of FIG. 5 may be implemented in a manner that is not inconsistent with a cellular telephone or similar cellular device. Antenna 516 receives and/or transmits data between the cellular tower and the mobile device, and RF transceiver 518 processes transmission data. Analog baseband block 520 represents data/sound signals in the analog realm. Audio codec 522 provides an interface between Audio I/O 524 and the rest of the mobile device. Audio I/O 524 includes audio transducers (e.g., speakers and microphones) for interfacing with the user of the mobile device. Keypad 526 allows a user to input data, such as telephone numbers or text. Digital baseband block 514 represents data/sound signals in the digital realm (and/or related circuit components therefor). The conversion between the digital and analog realms can be implemented using analog-to-digital converters, digital-to-analog converters and digital signal processors.

Display—I/O 508 can be implemented to provide additional interface options for the user of the mobile device. In one implementation, display 508 includes a liquid-crystal display (LCD) touch screen. Display controller 510 provides an interface between display 508 and the remainder of the mobile device.

Application processor 512 provides control over a number of mobile device functions by executing instructions stored in memory 502. In one implementation, memory 502 stores instructions 504, which function as the operating system for application processor 512. Memory 502 also stores call-handling application data 506, which is capable of (when executed) performing one or more of the various functions discussed herein including, but not necessarily limited to, call interception, interface with an authentication server and connection to a call-routing server.

The various embodiments described herein can be implemented in connection with a variety of additional functional aspects. Such additional functionality can further facilitate and enhance the user experience. Such additions do not depart from the scope of the present invention whether or not they are explicitly disclosed herein. Notwithstanding, a few examples of such functionality are described as follows in connection with example implementations.

When a user begins using a different mobile device (e.g., after purchasing a new iPhone 3G™ to replace an older iPhone™), the calling application can be re-authenticated from the new device, and can be terminated on the old device. This can be accomplished, for example, by invalidating the current MD5 key stored on the old device, or by modifying an authentication at a remote authentication server and effectively denying the old device access to the system. Alternatively, the user may request that the old device remain on the same plan. This could be useful for large entities that reuse their mobile devices. For instance, an employee may receive a new mobile device, while the old mobile device may be allocated to another employee.

In another implementation, a variety of useful information is provided for review by the user, via an installed call-routing application as discussed herein. For instance, an application can be provided that allows the user to look at call logs to view the number(s) dialed, the start time of the call(s), the duration of the call(s), how much the call(s) costs and/or cost savings realized over standard calling rates. The application could also allow for integration with the address book (contacts). The application can be configured to allow the user to dial by selecting a user from the contact list and also allow for management of the contact list. This can also be useful, where the user wishes to identify call numbers to be included or excluded from using the call-routing service. For example, the user can select contacts for which the plan allows for unlimited calling so as to exclude calls to the selected contacts from unnecessarily using the call-routing service. In some implementations, the user can be prompted with the option of selecting desired call-routing choices.

According to another implementation, a call-routing service is used (and billed) based upon the account information of a particular user, instead of information regarding the mobile device used to make calls. For instance, wherein a mobile device is borrowed, a borrowing user may use registration information specific to the user in calling with the borrowed device. Considering a situation where two users each subscribe to the call-routing service with respective mobile devices, a first user may wish to use a second user's mobile device to place a call that would benefit from the call-routing service (e.g., the first user is in a foreign country where his mobile device does not work properly). Rather than the second user being charged for the entire cost of the call, the first user can provide authentication information (e.g., a password). The system can then charge the first user for at least the call-routing service portion of the call (e.g., where there is a per-minute or per-use charge for the service).

Various example embodiments are directed to non-voice communications, such as text messaging, video messaging or other data transfer. In one such implementation, the application text messages are sent and received using a call-routing service provider as described herein. An application installed on a phone or other mobile device allows the device to send and receive text messages and/or files using the call-routing service provider. A mechanism is configured to recognize the type of an incoming communication (e.g., a text message). One such mechanism involves the use of a look-up table that contains the access (telephone) number of text-only call-routing service providers. When a call is received, the ANI information and the look-up table are used to determine if the incoming call contains text information. In response to the determination, the application can then either answer the call to process the text message data or allow the call to be answered by the user.

Another aspect of the present invention relates to the use of a configuration interface, such as a website, that allows a user to configure settings to adjust how the call-routing service functions. In one such implementation, the interface allows the user to select the criteria used to determine whether or not to use the call-routing service. This can be implemented by selecting options such as "all international calls use service," "use cheapest routing," or "match calls to calling plan XYZ" (where calling plan XYZ is the user's calling plan for the mobile device). These types of options could be particularly useful for individual users for whom complex calculations are not desired. For other individuals and/or large entities, however, it can be particularly useful to provide extensive customization options. Thus, the interface can also allow users to set very specific criteria including, but not limited to, time of day, current call times, current charges, charge limits, call time limits, rules for specific numbers, individual area code settings, roaming settings, individual country settings and even specific decision algorithms.

The interface can also be configured to provide data on the current call volumes, call charges, call times and the like. For sophisticated users, this data can be downloaded as a data file. This allows the user to perform desired auditing or cost calculations. For less sophisticated users, summaries of the call information can be provided in table or graph form. The summary can include, for example, the estimated cost savings obtained using the service.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, the methods, devices and systems discussed herein may be implemented in connection with a variety of technologies such as those involving cellular phones, personal digital assistants, iPhones™, Blackberries™ and the like. Various functional blocks as represented as part of systems, devices or methods may be implemented with one or more circuits and/or programmed devices, such as described above. Similarly, reference to one or more software-based applications may refer to the execution of functions by one or more circuits configured to perform in accordance with the described applications. Various embodiments may also be implemented using a variety of approaches such as those involving a number of different VoIP technologies. Such modifications and changes do not depart from the true spirit and scope of the present invention, including that set forth in the following claims.

What is claimed is:

1. A mobile audio cellular communications device comprising:
   a processing circuit configured to respond to a telephone number connection request, for an endpoint telephone number that corresponds to a remote communications endpoint, by,
      in a first mode, sending a connection request to prompt a PSTN to route the connection request according to the endpoint telephone number, and
      in a second mode,
         contacting an authentication server using an Internet connection and providing the endpoint telephone number and security data to the authentication server via the Internet connection,
         receiving, from the authentication server, a routing telephone number for a call-routing provider responsive to the mobile audio cellular communications device being authenticated,
         sending a connection request to prompt a PSTN to route the connection request according to the received routing telephone number, and
         establishing audio communications with the remote communications endpoint over a connection with the call-routing provider, based on the provided endpoint telephone number and security data as provided from the authentication server to the call-routing provider and stored at a call routing platform.

2. The device of claim 1, wherein the processing circuit is further configured to establish audio communications with the remote communications endpoint using a Voice-over-Internet Protocol link initiated by the call-routing provider.

3. The device of claim 1,
   further including a radio-frequency transceiver configured to establish communications over a cellular telephone system, and
   wherein the processing circuit is configured to use the radio-frequency transceiver to send and receive data for establishing the connection for communicating with the remote communications endpoint.

4. The device of claim 1, wherein the processing circuit is further configured to, in the second mode, transmit encrypted authentication data to the authentication server.

5. The device of claim 1, wherein the processing circuit is further configured to send encrypted authentication data, stored as a cookie by the mobile audio cellular communications device, to the authentication server for authenticating the mobile audio cellular communications device to receive the routing telephone number.

6. The device of claim 1, wherein the processing circuit is configured to, in the second mode, determine whether or not to contact the authentication server based upon the endpoint telephone number.

7. The device of claim 1, wherein the processing circuit is configured to, in the second mode, determine whether or not to contact the authentication server in response to the endpoint telephone number being an international telephone number.

8. The device of claim 1, wherein the processing circuit is further configured to, after receiving the telephone number connection request, implement the steps independently from further user input.

9. The device of claim 1, wherein the processing circuit is further configured to
send encrypted authentication data, stored as a cookie by the device, to the authentication server, and
in response to receiving a communication from the authentication server indicating that the authentication data is incorrect, request a new cookie from the authentication server.

10. The device of claim 1, wherein the processing circuit is configured and arranged to, in the second mode,
provide the endpoint telephone number and encryption data to the authentication server, and
establish the audio communications with the remote endpoint by accessing a call floor platform, via the routing telephone number, at which the endpoint telephone number and additional data are stored, and establishing the audio communications via the provided telephone number stored at the call floor platform.

11. A method for establishing communications between a mobile cellular communications device and a remote communications endpoint, the method comprising:
in a processing circuit of the mobile cellular communications device,
detecting, at the mobile cellular communications device, a user input indicative of an endpoint telephone number for a remote communications endpoint,
establishing an authentication communications link to an authentication server using an Internet connection and providing the endpoint telephone number and security data to the authentication server via the authentication communications link, and
receiving, at the mobile cellular communications device, a service-provider telephone number from the authentication server via the authentication communications link;
communicating the dialed telephone number and security data to the service provider, in response to authenticating the mobile cellular communications device;
establishing a service-provider communications link to the service-provider using the received service-provider telephone number; and
establishing audio communications with the remote communications endpoint via the service-provider communications link, by accessing a call floor platform, via the service-provider telephone number, at which the endpoint telephone number and security data is stored, and establishing the audio communications via the provided telephone number and security data stored at the call floor platform.

12. The method of claim 11, wherein the step of establishing audio communications includes using a Voice-over-Internet Protocol connection between the service provider and the remote communications endpoint to communicate audio with the remote communications endpoint.

13. The method of claim 11, further including the steps of, in the processing circuit,
establishing a connection to a web-interface,
providing registration information to the web-interface,
receiving at least one software application via the web-interface and executing the software application in the processing circuit to carry out at least one of the steps of detecting, establishing an authentication communications link, receiving, establishing a service-provider communications link and establishing audio communications, and
storing security data for use in establishing the authentication communications link with the authentication server, wherein the step of establishing the authentication communications link includes providing the stored security data to the authentication server to authenticate the mobile cellular communications device.

14. The method of claim 11,
further including the steps of, in the processing circuit,
establishing a connection to a web-interface, and
providing, via the web-interface, a Uniform Resource Locator (URL) generated uniquely for the mobile cellular communications device and having a window of time after which the URL is no longer valid, and
wherein establishing an authentication communications link includes using the URL to establish the link with the authentication server.

15. The method of claim 11, wherein the receiving steps and the steps of establishing an authentication communications link, establishing a service-provider communications link and establishing audio communications are carried out independently from further user input, after receiving the user input indicative of an endpoint telephone number.

16. The method of claim 11, wherein establishing an authentication communications link includes determining whether to connect to the authentication server as a function of the endpoint telephone number and establishing the authentication communications link in response to determining to connect to the authentication server.

17. The method of claim 11, wherein establishing an authentication communications link includes determining whether to connect to the authentication server in response to the endpoint telephone number representing a number for which an international telephone connection is required.

18. The method of claim 11, further including, in the processing circuit, providing user access to a log of call data.

19. The method of claim 11, wherein detecting a user input includes using a list of stored numbers to identify an endpoint telephone number, in response to the user input.

20. The method of claim 11, further including, in response to a request for activation of a second mobile cellular communications device by an owner of said mobile cellular communications device,
in the processing circuit, disabling functions in the processing circuit to disable the ability of the processing circuit to establish connections for the audio communications via the service-provider communications link, and
in a second processing circuit of the second mobile cellular communications device, enabling functions in the second processing circuit for enabling the second processing circuit to establish connections for the audio communications via the service-provider communications link.

21. The method of claim 11,
further including, in the processing circuit, communicating the endpoint telephone number and encryption data to the authentication server via the authentication communications link, and
wherein establishing audio communications with the remote communications endpoint via the service-provider communications link includes using the communicated endpoint telephone number and additional authentication data stored at the service-provider to establish the audio communications.

22. The method of claim 21, further comprising
communicating the endpoint telephone number and encryption data from the authentication server to the service provider, and
storing the endpoint telephone number and encryption data at the service provider.

23. A system for establishing communications between a mobile cellular communications device and a remote communications endpoint, the system comprising:
   an authentication server;
   a packet-based service provider for connecting to the remote communications endpoint;
   a mobile cellular communications device configured to
      detect user input requesting a connection to a remote communications endpoint corresponding to a dialed telephone number;
      contact the authentication server using an Internet connection and provide the dialed telephone number and security data to the authentication server via the Internet connection;
      receive, from the authentication server, a service-provider telephone number for the packet-based service-provider;
      connect to the service-provider using the received service-provider telephone number; and
   establish audio communications with the remote communications endpoint via the connection to the service provider; and
the authentication server being configured and arranged to
provide the dialed telephone number and security data to the packet-based service provider, in response to authenticating the mobile cellular communications device; and
establish the audio communications between the mobile cellular communications device and the remote endpoint by accessing a call floor platform, via the service-provider telephone number, at which the endpoint telephone number and security data is stored, and establishing the audio communications via the provided telephone number and security data stored at the call floor platform.

* * * * *